United States Patent Office 3,824,114
Patented July 16, 1974

3,824,114
METHOD OF APPLYING GRAFT COPOLYMER TO CELLULOSIC SUBSTRATE AND RESULTANT ARTICLE
Anthony E. Vassiliades, Deerfield, and David N. Vincent, Glenview, Ill., and Shrenik Shroff, Bombay, India, assignors to Champion International Corporation
No Drawing. Filed May 12, 1971, Ser. No. 142,772
Int. Cl. B44d 1/094
U.S. Cl. 117—21
22 Claims

ABSTRACT OF THE DISCLOSURE

Discrete, substantially spherical microcapsules having a solid polymeric shell and a solid, non-tacky polymeric core, which is grafted to the polymeric shell, are provided. Such microcapsules may be coated onto cellulosic substrates or incorporated into such substrates and subsequently fused to provide cellulosic substrates having a polymeric film bonded thereto and increased strength, respectively. The grafting of the normally nonadherent core material to the shell of the microcapsules provides a means of forming a bond between a normally nonadherent polymer and a cellulosic material. The microcapsules may also be employed as load bearing agents and/or opacifying agents.

---

This invention relates to grafted, polymerized, microcapsular products and the use of such products in the production of plastic coatings, opacifying agents, and spot welds for cellulosic fibers. More particularly, this invention relates to microcapsular products having a non-tacky, polymeric core.

Certain polymeric products including thermoplastics such as polystyrene, are normally nonadherent with respect to cellulosic materials such as paper substrates. However, for many applications it would be highly desirable to provide a cellulosic substrate with such a plastic coating. Such coatings possess certain desirable physical and chemical properties not possessed by cellulosic substrates, such as paper. Various proposals have been made for coating polymeric materials, such as polystyrene, onto or incorporating such polymers into cellulosic substrates. However, attempts to do so have proved unsuccessful due to the poor adhesion of the polymeric material to the cellulosic fibers. Although it would be advantageous to be able to produce films of thermoplasitc materials on a paper substrate, for example, such films are normally incompatible and difficult to bond to paper. In addition, in many instances the resulting substrate has lost the desirable "paper qualities" in those instances where it is not desired to lose such qualities. For example, if you saturate a paper substrate with a polymeric suspension, you may end up with a substrate that does not have the desirable folding and/or flexibility properties of paper. Likewise, if the polymer particles are admixed with the cellulosic fibers to be formed into a paper sheet, there is the handling problem of retaining the polymeric particles with the fibers and preventing their passage into the effluent stream.

It has now been found that cellulosic substrates may be successfully coated and/or permeated with polymeric materials that are normally nonadherent to cellulosic substrates in their particulate form by treating such substrates with discrete, substantially spherical microcapsules, which have a solid, polymeric shell and a solid, non-tacky, polymeric core that is at least partially grafted to the shell. The polymeric shell of the microcapsules is composed of material or materials that are compatible with cellulosic materials, while the core is a non-tacky polymer and is at least partially grafted thereto. These microcapsules may be fused, if desired, and thus form a polymeric film that is compatible with a cellulosic substrate.

Thus, such microcapsules may be coated onto a cellulosic substrate or permeated into the cellulosic substrate, and the substrate may be heated to bond the capsules to the cellulosic fibers.

The microcapsules of the present invention are provided by forming precursor microcapsules having a monomeric core that is capable of being polymerized in situ to form a solid, non-tacky polymer. During polymerization, the polymeric core becomes at least partially grafted to the solid, polymeric shell which surrounds the core. Any monomeric material which is capable of being encapsulated in a microcapsule and polymerized therein to form a solid, non-tacky polymer may be employed in the present invention. Suitable monomeric materials include ethylenically unsaturated monomers, for example, acrylic esters, such as methyl acrylate, methyl methacrylate, methyl alpha-chloroacrylate; vinyl esters, such as vinylacetate; vinyl ketones, such as methyl vinyl ketone; as well as other miscellaneous vinyl monomers, such as vinylidene chloride, styrene, divinyl benzene, acrylonitrile and the like; olefins such as cyclopentadiene, isoprene, alone or in admixture to provide the desired properties.

The microcapsules of the present invention may be suitably utilized in any application wherein it is desired to bond a normally nonadherent polymer to a cellulosic material. Thus, for example, the present polymeric core-containing microcapsules may be coated onto a cellulosic substrate and thereafter subjected to appropriate heat and pressure conditions to provide an adherent polymeric coating that is bonded to the cellulosic substrate. For example, normally nonadherent polystyrene may be coated onto a paper substrate by providing styrene monomer in microcapsules and subjecting the capsules to polymerization conditions so as to form polystyrene, which is at least partially grafted to the capsule walls. Next, the microcapsules are coated onto paper. If it is desired, they may then be subjected to heat and pressure sufficient to fuse the capsules and form a polystyrene coating which is bonded to the paper to impart a plastic finish to the surface of the substrate. On the other hand, as will be hereinafter shown, if a polystyrene latex is coated onto a cellulosic substrate, the resultant coating is essentially nonadherent. On subjecting this sheet to temperature and pressure conditions suitable to provide the fusion of the polymer thereon, the resultant coating is highly unsatisfactory and has poor adhesion to the cellulosic substrate.

Additionally, small diameter, polymer-containing microcapsules of the present invention may be permeated into a preformed paper web, or admixed with fibers to form a web containing interspersed capsules, for example, then heated to fusion in a press or calender thereby providing a "spot-welding" of the fibers at points of fiber intersection therewith by means of the fused polymer particles. Employing this technique, the paper can retain its "paper properties."

The quantity of polymer-containing microcapsules to be employed will depend upon the qualities desired in the ultimate product. Thus, for example, between about 1 and about 15 or 20 percent by weight of the resulting substrate may be comprised of the present polymer-containing microcapsules and the product will still retain its paper-like qualities. On the other hand, if a more rigid, plastic-like product is desired, the percentage of microcapsules may be increased.

Another aspect of the present invention relates to the employment of the present microcapsules as load bearing agents in record systems employing dye-containing microcapsules. The present microcapsules may be formed of a shell that is identical to that of the microcapsules employed in a transfer copy system, for example, which microcapsules contain the dye-forming material. In this manner, the load bearing capsules are compatible with the same binder materials employed for the dye-carrying microcapsules. Thus, a separate binder is not required. In such instance, the instant microcapsules would be provided with an average particle diameter in excess of that employed for the dye-carrying microcapsules and would be coated onto the paper along with such microcapsules. The capsules of the present invention would thereby act as load bearing agents to prevent smudging and the like, caused by stacking of paper carrying the dye containing microcapsules. Although load bearing agents in the form of cellulosic fibers, oil-containing microcapsules and the like have been proposed, the load bearing microcapsules of the present invention possess many advantages over the previously-proposed load bearing agents. For example, the present capsules are less fragile than are oil-containing microcapsules. Likewise, the present load bearing agents have a more desirable shape, and a size which is more easily controlled than is the case with cellulosic fiber-type load bearing agents. For load bearing purposes in a transfer copy system, the polymer-containing microcapsules may have an average particle diameter between about 5 and about 50 microns, preferably about 15 to about 30 microns.

The present encapsulated polymeric material may be employed in various applications which demand strict control of polymer particle size. Thus, polymer-containing microcapsules may be formed, for example, having an average particle diameter of between about 0.5 and about 1.0 micron and may be used as opacifying agents. Surprisingly, it has been found that such particles are capable of imparting a high opacity to surface coatings of various substrates. Likewise, the present polymer-containing microcapsules may be interspersed with cellulosic fibers and formed into a web of such fibers. The polymer-containing microcapsules act as non-abrasive, opacifying agents and impart a high opacity to the cellulosic substrate ultimately formed.

Polymeric materials, which may be employed in the present system may possess a relatively low density, e.g., about one gram/cc. Thus, the present polymer-containing microcapsules do not greatly increase the weight of the substrate, such as the case with high density, inorganic pigments, e.g., $TiO_2$, which are conventionally employed to increase substrate opacity.

A multitude of applications have been proposed for microcapsular products. Whereas the most widely known and commercially accepted usage of such products has been in the field of record sheet materials, it has been proposed to provide microcapsules with a tacky, adhesive-containing core material which will provide an adhesive material upon rupture of the capsular wall. Thus, for example, U.S. 2,986,477 to Eichel discloses the production of an adhesive tape by providing a profusion of microcapsules containing a nucleus of a tacky adhesive on a base web, which adhesive is exposed upon rupture of the capsular wall. A similar disclosure is found in U.S. 2,907,682 wherein a substrate is coated with capsules containing a solid soluble adhesive and capsules containing a liquid solvent for the adhesive. More recently, U.S. Pat. 3,516,941 to Matson discloses an Example 15 wherein microcapsules are provided with a viscous, sticky adhesive in the form of a polymerized fusel oil acrylate, which is formed by polymerization of the monomeric material in the microcapsule. However, in each of the prior systems, the polymeric core material is a tacky material which, unlike the polymeric core of the present microcapsules, is normally adherent to cellulosic substrates and the like. In addition, unlike the microcapsules of the prior art, the present microcapsules are not "pressure rupturable," since they have a solid, non-tacky core. The term, "non-pressure rupturable" as used herein is intended to mean that the capsules are not rupturable under ordinary pressures, e.g., a writing instrument, or the like, for the purpose of releasing a liquid or tacky core material.

Any one of a variety of materials can be used to form the capsule walls of the microcapsules of the present invention. Thus, by practice of this invention, a single given polymerizable material, such as styrene, may be encapsulated by any of a number of different materials, such as urea-formaldehyde resin, gelatin, polyamide, and the like. After subjecting the microcapsules to polymerization conditions, the resulting products consist of polystyrene particles, for example, surrounded by a thin skin of the chosen encapsulant material. In this manner, the surface properties of said polystyrene particles may be adjusted to be more compatible with the particular substrate to which these microcapsular particles are to be applied. For example, in the case where the polymer-containing microcapsules are to be applied to a paper substrate as an opacifying agent, the use of a highly polar and hydrogenbondable wall material, such as urea-formaldehyde resin, results in a product that is highly adherent to the substrate. Thus, such capsules are retained by the paper substrate much more efficiently than the inorganic pigments, e.g., $TiO_2$, or than unencapsulated polystyrene particles.

On the other hand, this same monomer can be encapsulated, for example, with polyvinyl chloride providing, after subsequent polymerization, a polystyrene particle is encased in a thin skin of polyvinyl chloride. Such particles could then be dispersed in a polyvinyl chloride matrix to provide a compatible composite.

Polymerization of the present precursor microcapsules may be initiated thermally, e.g., by the application of heat alone, or with the aid of a polymerization catalyst, such catalyst being either an oil-soluble material, e.g., benzoyl peroxide, incorporated in the dispersed monomer phase, or a water soluble material, e.g., potassium persulfate, incorporated in the continuous aqueous phase. Thus, the present microcapsules may be provided with a core containing the monomer, styrene, and an effective amount of a polymerization catalyst for the styrene, such as benzoyl peroxide.

Alternatively, the monomer may be encapsulated and the polymerization catalyst then dissolved in the continuous phase, whereupon polymerization occurs when such an initiator radical diffuses into the capsule.

Likewise, a non-catalytic system may be employed wherein a monomer, such as styrene, may be provided as the liquid core of the microcapsule in the absence of a catalyst in the core and subsequently polymerized thermally, or by the application of radiation. Also, more than one monomer may be provided in the microcapsule in order to form a copolymeric core.

The term "core" as employed herein refers to that portion of the microcapsule which is contained within the solid wall or shell formed by the encapsulating agent and which is in the form of a filled-in (as opposed to a hollow) sphere. Whereas the core of the present monomer-containing precursor microcapsules is liquid throughout its entire cross-section, the core of the polymerized microcapsule is substantially solid throughout its entire cross-section.

Either a catalytic or a non-catalytic polymerization system may be employed. If a catalytic polymerization system is desired, those systems generally referred to as free radical-type, may be suitably employed. Ionic catalysis could also be utilized insofar as the catalytic specie is not inhibited or destroyed by the dispersing medium. Thus, in an aqueous medium, sodium hydroxide, an anionic catalyst, could be used to initiate the polymerization of acrylonitrile, however the use of butyl lithium to initiate the polymerization of styrene in such a system is impractical. On the other hand, this catalyst, as well as a cationic catalyst, such as titanium tetrachloride, could be used if the suspending medium were a saturated hydrocarbon fluid.

Catalysts can be incorporated either into the dispersed monomer phase or the continuous phase. The latter technique generally leads to the formation of polymers of higher molecular weight. Suitable catalysts include, for example, radiation, benzoyl peroxide, potassium persulfate, lauroyl peroxide, tertiary-butyl hydroperoxide, sodium peroxydiphosphate, hydrogen peroxide, azobisisobutyronitrile, and the like. Redox systems, such as potassium persulfate-sodium metabisulfite, cumene hydroperoxide-cobalt salt, benzoyl peroxide-dimethylaniline, and the like can also be used. Subject to the criteria discussed previously, anionic catalysts, such as sodium hydroxide, potassium amide, sodium metal, butyl lithium, and the like; or cationic catalysts, such as aluminum chloride, titanium tetrachloride, boron trifluoride, and the like, with suitable co-catalysts when needed, may be used.

Catalyst concentrations may be varied over a wide range depending upon the purity of the monomer and molecular weight desired. Thus, for example, suitable amounts of catalyst include between about 0.01 and about 5 percent, preferably between about 0.1 and about 1.0 percent of the weight of the polymerizable monomer.

The polymerization of the monomer may be carried out under a variety of conditions. The same general criteria that affect normal polymerizations are still operable under this process. Thus, the molecular weight increases and the reaction rate decreases as the catalyst concentration and/or the reaction temperature is decreased. Conversion, or extent of reaction, is a function of reaction time at any particular combination of catalyst concentration and temperature. Conventional chain modifiers, such as dodecyl mercaptan, may also be used to regulate molecular weight. Thus, the molecular weight of the resultant polymer may be controlled by conventional means within the range normally obtainable with conventional procedures, depending upon the ultimate use of the polymer.

A vital feature of this invention is the ability to graft at least a portion of the polymer formed inside the capsule to the capsule wall. The extent of grafting is dependent on the nature of the wall material, monomer, catalyst and the processing conditions used. Thus, for example, the use of a catalyst in the dispersing medium, where it must first come in contact with the capsule wall before it can initiate polymerization of the monomer, generally results in a greater amount of grafting than the case where the catalyst is initially placed inside the capsule. The use of higher polymerization temperatures also promotes the grafting reaction. Also, those wall materials which are more susceptable to chain transfer reactions with the initiator specie or with the growing polymer chain-end produce products with greater amounts of grafted polymer.

The portion of the solid polymer core that is grafted to the capsule wall may be varied over a wide range. For example, it may be between about 20 percent and about 80 percent of its weight depending upon the particular application. Thus, when the microcapsules are to be employed as "spot welds" a higher degree of grafting is preferred, e.g., between about 50 and about 80 percent. For fused coatings a moderate degree of grafting, e.g., between about 40 and about 60 percent, is preferred. Depending upon the ratio of wall material to core initially used to prepare the microcapsules and on the extent of grafting occurring during polymerization, the product, i.e., the solid-walled microcapsules having an essentially solid polymeric core, may contain from less than 10 percent to over 60 percent of the total capsule weight as free (ungrafted) polymer in the core.

This feature aids in promoting the adhesion between the polymer and substrate when the capsule coating is subsequently fused. In this case, the graft polymer serves as a compatibilizing agent, promoting the adhesion between the substrate and the ungrafted polymer. The general theory of compatibilization is described in U.S. Pat. No. 3,485,777 to Gaylord.

Any suitable means of microencapsulation may be employed for the encapsulation of the liquid polymerizable monomeric system. Thus, the methods disclosed in U.S. Pats. Nos. 3,418,656 and 3,418,250 to Vassiliades may be suitably employed wherein the present the polymerizable monomeric system is substituted for the oily substance employed in the methods disclosed therein. The disclosures of these patents are hereby incorporated by reference.

In a preferred method, for example, microcapsules containing the liquid polymerizable monomeric system may be produced by the simple admixing of the following ingredients:

(A) a liquid, polymerizable monomeric system;
(B) an amphiphilic emulsifying agent;
(C) at least one polymeric resin selected from the group consisting of:
   (1) a hydrophobic, thermoplastic resin in a water- and oil-miscible organic liquid medium, said thermoplastic resin being capable of being separated from the medium in solid particle form as a precipitate upon dilution with water;
   (2) a partially condensed thermosetting resin in an aqueous medium, said resinous condensate being capable of being separated in solid particle form from the aqueous medium as a precipitate upon dilution with water; and,
(D) water in a quantity sufficient to cause the separation of at least one of the polymeric resins from its respective medium.

The sequence of the admixing of the foregoing materials must be such that the encapsulation of the polymerizable monomeric system by the resin by dilution with water and ultimate separation of the polymer in solid particle form about a nucleus of the liquid polymerizable monomeric system upon dilution with water occurs no sooner than simultaneous with the formation of the emulsion. In other words, dilution, which can be performed by the addition of water to the polymerizable monomeric system-emulsifier-resin admixture of by the addition of the resin to the water-polymerizable monomeric system-emulsifier-admixture, must be the final operation of the encapsulation process. Thus, in the first case the emulsifying operation and encapsulation operation can be considered to take place simultaneously, whereas in the second case, the emulsion has been already formed when it is admixed with the resin. In the foregoing manner, capsule walls of an essentially impermeable precipitate of a hydrophobic resin are formed about a nucleus of the liquid monomer.

Emulsifying agents which may be used in the formation of the microcapsules are "amphiphilic." That is, while the emulsifiers are generally preferentially soluble in one phase of the emulsion, they do possess an appreciable affinity for the other phase. It can be said that an amphiphilic emulsifier will give the monomer, such as styrene, a more hydrophilic nature than it had before, and conversely, give water a more lipophilic nature. Exemplary of the amphiphilic emulsifying agent which can be used in the instant invention are: naturally-occurring lyophilic colloids including gums, proteins and polysaccharides, such as gum arabic, gum tragacanth, agar, gelatin and starch; and synthetic materials such as methyl cellulose, hydroxyethylcellulose, polyvinyl pyrrolidone, and the salts of copolymers of styrene and maleic anhydride.

The partially condensed thermosetting resin that may be used as an encapsulating agent in the present invention must be water insoluble in its solid infusible state. These resins comprise that broad class of compositions defined as formaldehyde condensation products of formaldehyde with phenols such as hydroxybenzene (phenol), m-cresol and 3,5-xylenol; carbamides, such as urea; triazines such as melamine; amino and amido compounds, such as aniline, p-toluenesulfonamide, ethylene urea, guanadine; ketones, such as acetone and cyclohexanone; aromatic hydrocarbonds such as naphthalene; and heterocyclic compounds such as thiophene. Under the influence of heat, these resins change irreversibly from a fusible and/or soluble material to one that is infusible and insoluble.

The preferred formaldehyde condensation products employed in this aspect of the present invention are the condensed melamine-formaldehyde, phenol-formaldehyde and urea-formaldehyde resins. These partially condensed resins can be prepared easily according to conventional practices. For example, one of the melamine-formaldehyde partial condensates or syrups that may be used is prepared by refluxing 125 grams of melamine in 184 milliliters of formalin (37 percent by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92° and 96° C. or until 1 volume of the condensate become turbid when diluted with 2 to 10 volumes of water. The condensate can be used immediately or can be stored for later use by adding a small amount, about 6 to 15 percent by weight, of methanol to the condensate. The methanol prevents any further rapid condensation of the resin solution upon standing and can be evaporated from the syrup, if desired, either prior to or during the admixing operation.

Similarly, a suitable urea-formaldehyde resin syrup may be prepared by substituting an equivalent molar quantity of urea for the melamine. The thermosetting resinous condensate of the present invention is employed in the form of an aqueous dispersion, clear or turbid, aqueous solution, or solid suspension in water of a partially-condensed, highly cross-linkable resin. The solution, dispersion or suspension are capable of being diluted up to at least twice their volume with water before any appreciable separation of the resin occurs from the water, i.e. precipitates. Thus, the condensate as employed in the present invention may be an aqueous solution similar to that produced in the synthesis of the melamine-formaldehyde condensate previously described. Alternatively, the synthesis reaction may be continued beyond the time required to produce a clear solution so that the resulting product is either a clear or turbid dispersion of the condensate in water.

In addition, the aqueous condensate liquid may be prepared having a solids content which may be varied over a wide range, for example, between about 50 and about 80 percent solids. If a high solids-containing aqueous liquid is prepared initially, it may be diluted with water to a lower solids content before utilization in the microencapsulation process. In such instance, the diluted liquid may become turbid.

After the microcapsules are formed, further condensation or cross-linking of the resin may be accelerated by the application of heat and/or catalyst to the precipitated particles. Thus, microcapsules comprising walls of a thermosetting resin material become harder with the passage of time. Once the polymerizable monomeric system is encapsulated in a first resinous wall, a second dilution operation may be effected by simply adding another resin solution to the aqueous dispersion of the first-formed microcapsules. Consequently, double-walled microcapsules having an outer containing wall of the second resin are produced.

Brisk agitation is required in order to obtain very small droplets of the emulsion, and, ultimately, very small capsules. However, microcapsules having any desired average particle diameter may be produced as desired. Microcapsules having diameters ranging from below about 1 micron preferably between about 0.25 and one micron may be produced when it is desired to employ resulting polymerized products as opacifying agents. However, microcapsules having an average particle diameter of between one and 100 microns may be produced for other usages, such as for coating substrates and subsequent fusion of the microcapsular coating in order to produce a plastic surface of for "spot-welding a fibrous substrate.

Agitation of the emulsion may be achieved by means of a high speed mixer or impeller, by ultrasonic waves or by other conventional means. This agitation need be maintained only in the zone of immediate admixing and not throughout in a manner such that the emulsion droplets have a predetermined average diameter prior to encapsulation so that upon completion of the encapsulation the final particle diameter of the microcapsules is within the desired range.

Suitable encapsulation temperatures include, for example, between about 0° and about 100° C., preferably between about 25° and about 45° C. Of course, temperatures should not be employed which cause premature polymerization of the monomer, i.e. prior to encapsulation.

Regardless of the manner of providing the monomer system-containing microcapsules, the microcapsules are thereafter subjected to polymerization conditions in order to cause the liquid monomeric system to polymerize to form a solid spherical polymeric core within the microcapsules. Accordingly, in order to cause polymerization of the microcapsules they may be heated, for example, to temperatures, in the range of between about 0° and about 200° C. depending upon the catalyst system employed. Thus, for benzoyl peroxide, the preferable temperature is between about 60° and about 90° C. for a period of time, for example, of between about 2 and about 24 hours preferably between about 3 and about 6 hours. For a potassium persulfate-sodium metabisulfite redox system, on the other hand, the preferred temperature is between about 20 and about 40° C. Such conditions are completely conventional in the practice of polymerization technology and would be within the skill of the art.

The temperature of polymerization may be varied over a wide range depending upon the particular monomer or monomers undergoing reaction and whether or not a catalyst is employed. However, the upper temperature limit will be that at which the structural integrity of the microcapsular wall is destroyed or rapid volatilization of the dispersing medium occurs. The temperature will be dependent on the nature of the wall material as well as of the dispersing medium. Obviously, a thermosetting capsular wall material can be utilized at higher temperatures than a thermoplastic one. The polymerization reaction may be conducted in a closed, pressurized vessel, if desired, to reduce the volatility of the ingredients.

The heating of the microcapsules in order to induce polymerization may take place at any time subsequent to their formation. Thus, for example, immediately following the microencapsulation step, the entire microcapsular dispersion may be heated to temperatures sufficient to decompose the catalyst (if one is used) and initiate polymerization. On the other hand, the monomer-containing microcapsules may first be coated onto or incorporated into the desired substrate and subsequently heated or irradiated to induce polymerization of the monomeric core. In general, the microcapsules may be heated to any temperature capable of polymerizing the encapsulated monomer. Preferably, a constant temperature is maintained on the system until the polymerization is complete or until the desired extent of polymerization is attained.

As previously mentioned, the walls of the polymer-containing capsules may be cured either by the addition of the curing catalyst, or by adjusting the temperature of the system, for example, in the range of between about 25° and 100° C., preferably between about 60° and 80° C., or by a combination of both catalyst and temperature. Alternatively, depending upon the specific system employed, the walls of the microcapsules may be cured prior to the polymerization of the monomeric core. Likewise, the microcapsules may be spray-dried either prior to or subsequent to polymerization in order to separate them from the liquid medium in which they are suspended. Spray-drying may be conducted at temperatures in the range of between 60° and 200° C., preferably between about 85° and 100° C., for example. A small amount of a polymerization inhibitor may be incorporated into the monomer prior to encapsulation to retard polymerization when employing elevated temperatures.

As previously mentioned, any suitable means of microencapsulation of the polymerizable monomeric system may be employed. Thus, the microcapsules may be formed by a process which is similar to those described in copending Vassiliades application, Ser. No. 583,046, filed Sept. 29, 1969 now abandoned, which is hereby incorporated by reference, in which the present polymerizable monomeric system is substituted for the oily material encapsulated therein. Likewise, encapsulation techniques involving the phenomenon known as "coacervation" may be employed for the formation of microcapsules for use in the present invention. Accordingly, any microencapsulation method whether chemical or physical, which is capable of yielding polymerizable monomer system-containing microcapsules may be employed in the process of the present invention.

The conditions employed for fusing the polymer-containing capsules, i.e., temperature and pressure, will depend upon the nature of the polymeric core and its molecular weight, the type of coating or spot-weld desired, the nature of the substrate; the wall thickness of the capsules to be employed, etc. The particular conditions which are desirable for a specific application may be easily determined, experimentally.

The following examples illustrate the production of polymer products having a predetermined particle size and constitute the best modes contemplated for carrying out the present invention.

EXAMPLE 1

Fifty grams of undistilled styrene monomer containing 1.0 grams of benzoyl peroxide are emulsified in 183 grams of an 8.2 percent aqueous solution of methyl cellulose in a Waring blender. Agitation is continued until the desired particle size is attained, whereupon 30 grams of a partially condensed (B-stage) urea-formaldehyde resin (65 percent solids) are added with brisk agitation. The suspension of microcapsules thus formed have an average particle diameter of about 0.7 micron.

The microcapsular suspension is then heated at 60° C. for 3 hours thereby forming microcapsules containing a polystyrene core. The average particle diameter of these polymer-containing microcapsules is about 0.7 micron, or essentially the same as the microcapsules prior to polymerization.

The capsular suspension is then dried, the recovered solids pressed under 10,000 lbs. at 150° C. to rupture the capsules. The resultant film is ground and extracted with refluxing benzene. About 10 percent of the dry capsule weight is recovered as soluble polystyrene having a viscosity average molecular weight of 685,000.

EXAMPLE 2

Styrene monomer containing 2 percent dissolved benzoyl peroxide is emulsified and encapsulated in the manner described in Example 1. However, the degree of agitation and mixing time is reduced to produce particles having an average diameter of about 5 microns. Polymerization is carried out at 60° C. for about 24 hours. Subsequent to polymerization the microcapsular suspension is spray-dried. Some aggregation occurs during this stage of the process, but the aggregates are easily comminuted.

A sample of the spray-dried capsules is hot pressed, ground, and extracted as described in Example 1, yielding 50 percent of the capsule weight as soluble polystyrene with a molecular weight of 490,000.

EXAMPLE 3

Fifty grams of distilled styrene monomer without an added polymerization catalyst are encapsulated as described in Example 1, thereby yielding microcapsules with an average diameter of 2.5 microns. One-half gram of a water-soluble initiator, potassium persulfate, is added to the aqueous phase and the suspension is heated at 60° C. for 24 hours to effect polymerization. The capsules are isolated by drying the suspension and then hot pressed, ground, and extracted with refluxing benzene. About 36 percent of the dry capsule weight is recovered as soluble polystyrene having a molecular weight of 951,000. A weight balance indicates that more than 80 percent of the styrene monomer is converted to polymer.

EXAMPLE 4

For comparative purposes, a polystyrene latex is prepared by standard emulsion polymerization techniques. Thus, 200 grams of distilled styrene monomer are emulsified in 360 grams of water containing 5 grams of potassium oleate. One gram of potassium persulfate is added to the aqueous phase, the emulsion is purged with nitrogen and heated at 60° C. for five hours. The particle size is estimated at about 0.1 micron and the polymer has a molecular weight of 957,000.

A film of this latex is deposited on a paper substrate using a 0.0005 inch Bird applicator. In a similar manner, films of the microcapsular suspensions prepared in Examples 1 and 3, respectively, are also deposited on paper substrates. These coatings are first air-dried and then further dried in an 80° C. force draft oven for 10 minutes. The latex coating is very chalky and easily rubs off on the fingers, whereas the two microcapsular coatings exhibit good adhesion to the substrate.

The coated papers are hot pressed at 160° C. under 2,000 p.s.i. between chrome plated steel sheets. The microcapsule coated papers yield a glossy smooth surface whereas the latex coated paper exhibits a splotchy surface.

EXAMPLE 5

Fifty grams of distilled styrene monomer are emulsified in 183 grams of an 8.2 percent aqueous solution of methyl cellulose under brisk agitation and 20 grams of a B-stage urea-formaldehyde resin (65 percent solids) are added. The suspension of microcapsules thus formed has an average particle diameter of about 3.5 microns.

The suspension is purged with nitrogen, one gram of potassium persulfate is added and then one gram of sodium bisulfite is dissolved in about 50 milliliters of water and is added incrementally over a six hour reaction period at ambient temperature. The resultant polymer-containing capsules still have an average diameter of about 3.5 microns.

EXAMPLE 6

Fifty grams of distilled styrene monomer are encapsulated and polymerized as described in Example 5, except that lesser quantities of materials are used in order to give a higher ratio of solid polymer core to the capsule wall. Thus, in this Example, 125 grams of 6 percent aqueous methyl cellulose solution, 5 grams of B-stage urea-formaldehyde resin (65 percent solids), 0.5 grams potassium persulfate and 0.5 grams sodium bisulfite are used. Capsules with an average diameter of 3.5 microns are obtained.

EXAMPLE 7

Fifty grams of distilled styrene monomer containing 0.5 gram of benzoyl peroxide are emulsified in 143 grams of a 7 percent ammoniacal solution of styrene-maleic anhydride polymer in a Waring blender. Five grams of a B-stage urea-formaldehyde resin (65 percent solids) are added with brisk agitation, yielding microcapsules having an average diameter of about 4 microns. The suspension is then heated at 60 to 65° C. for 32 hours to effect polymerization. The capsule size after polymerization is still about 4 microns.

EXAMPLE 8

Fifty grams of distilled styrene monomer are encapsulated and polymerized as described in Example 6 except that 75 grams of a 10 percent aqueous solution of benzylated starch is substituted for the methyl cellulose solution of that Example. The particle size of the resultant microcapsules, both before and after polymerization, is about 4.5 microns.

EXAMPLE 9

Fifty grams of distilled styrene monomer are encapsulated and polymerized as described in Example 6 except that 112.5 grams of a 20 percent aqueous solution of oxidized starch are substituted for the metayl cellulose solution and 36 grams of the urea-formaldehyde resin solution is used. The particle size of the resultant microcapsules, both before and after polymerization, is about 4.5 microns.

EXAMPLE 10

Fifty grams of distilled styrene monomer are dissolved in 100 milliliters of tetrahydrofuran containing 10 grams of polyvinyl chloride. The solution is agitated briskly and 70 milliliters of water containing 0.1 gram of sodium carbonate is added. As the stirring continues, 150 milliliters of water containing 12 grams of gelatin and 12 grams of methyl cellulose are added.

The microcapsular suspension is purged with nitrogen, 0.5 gram of potassium persulfate added, and then 0.5 gram of sodium bisulfite dissolved in 50 milliliters of water is added incrementally over a six hour reaction period at ambient temperature. The resultant polymer-containing microcapsules have an average particle size of 1.5 microns.

EXAMPLE 11

The microencapsulation and polymerization processes are conducted in the same manner as described in Example 6 except that a mixture of 37.5 grams distilled styrene and 12.5 grams distilled acrylonitrile are used as the polymerizable monomer system. The resultant polymer-containing microcapsules have an average diameter of 4 microns.

EXAMPLE 12

The encapsulation and polymerization are carried out in the same manner as described in Example 6 except that a mixture of 37.5 grams of distilled styrene and 12.5 grams distilled isoprene is used as the polymerizable monomer system. The resultant polymer containing microcapsules have an average diameter of about 5.5 microns.

A sample of each of the microcapsular suspensions produced in Examples 5 through 12 is dried, fused, ground, and extracted in the manner described in Example 1. The resulting material is analyzed and the results are set forth in Table I, below:

EXAMPLE 13

A mixture of 45 grams of distilled butyl acrylate and five grams of ethylene glycol dimethacrylate monomers are emulsified in 231 grams of a 6.5 percent aqueous methyl cellulose solution and 10 grams of a B-stage urea-formaldehyde resin (65 percent solids) are added.

Potassium persulfate in an amount of 0.4 gram, is added to the suspension, and 0.4 gram sodium bisulfite dissolved in 50 milliliters of water is then added incrementally over a six hour reaction period at ambient temperature.

The resultant polymer-containing microcapsules have an average diameter of about 4 microns.

EXAMPLE 14

Fifty grams of distilled styrene containing 0.75 gram of benzoyl peroxide are emulsified in 375 grams of 2 percent aqueous solution of methyl cellulose under mild agitation, and 5.33 grams of a B-stage urea-formaldehyde resin (61 percent solids) are added. The suspension of microcapsules thus formed have an average particle diameter of about 30 microns.

The suspension is heated to 80° C. for 2 hours to effect polymerization. The resultant polymer-filled microcapsules have a particle size of 30 microns, i.e., essentially the same as the capsules prior to polymerization. The resulting capsules provide excellent load bearing agents when coated onto copy paper along with dye-containing microcapsules in a transfer copy system.

EXAMPLE 15

A 20 percent aqueous suspension of polystyrene-containing microcapsules (average particle size 6 microns) is coated onto bond paper and dried under normal paper coating conditions. The dry coat weight is varied from 4 to 6 pounds/ream (3300 square feet). The paper is subsequently hot calendered at 80° C., 3 nips at 500 p.s.i. The microcapsular coating is fused to give a high gloss (approximately 65) coating that is water resistant and has excellent resistance to oil and grease.

EXAMPLE 16

A forty percent aqueous suspension of polystyrene-containing microcapsules (average particle size one micron) is cast coated against a highly polished chrome coated drum. The cast coating drum is heated to 120° C. to dry the coating and fuse the microcapsules. The dry coat weight is varied from one to four pounds/ream (3300 square feet). Even at low weights the coating has excellent gloss (approximately 70 to 80). However, the water resistance and barrier to oil and grease is improved at higher coat weights, and at 2 to 3 pounds/ream the coating is impervious.

The microcapsular coating is applied to both uncoated bond paper and bond paper which has 5 pounds/ream of clay coating, and calendered producing a high gloss coating. In the latter case, the gloss is approximately 10 to 20 percent higher than the unprecoated paper at corresponding coat weights.

TABLE I

| Polymer-containing microcapsules from Example No. | Conversion to polymer (percent by wt.) | Total polymer[1] (percent by wt.) | Soluble polymer[2] (percent by wt.) | Grafted polymer[3] (percent by wt.) | Grafted polymer add-on (percent by wt.) | Mol. wt. of soluble polymer |
|---|---|---|---|---|---|---|
| 5 | 75 | 57 | 15 | 75 | 100 | $2.1 \times 10^6$ |
| 6 | 88 | 80 | 25 | 69 | 281 | $1.6 \times 10^6$ |
| 7 | 95 | 78 | 59 | 24 | 87 | $3.0 \times 10^6$ |
| 8 | 96 | 82 | 24 | 71 | 324 | $1.6 \times 10^6$ |
| 9 | 69 | 44 | 8 | 83 | 64 | |
| 10 | 58 | 40 | 33 | 28 | 24 | $9.3 \times 10^6$ |
| 11 | 91 | 81 | 17 | 80 | 336 | |
| 12 | 41 | 65 | 41 | 38 | 71 | |

[1] Total polymer content of dried capsular suspension.
[2] Soluble polymer content of dried capsular suspension.
[3] Portion of polymer grafted to capsule wall material.

EXAMPLE 17

A twenty percent aqueous suspension of polystyrene containing microcapsules (average particle size 0.8 micron) is coated onto bond paper with conventional paper coating techniques. The opacity of the uncoated and coated paper is 72 percent and 84 percent, respectively. This represents an increase of 12 units for a coat weight of 5 pounds/ream.

Polymeric products of the present invention may be employed in any application where polymeric particles having a substantially spherical shape and predetermined particle size are desired. Thus, for example, the subject polymeric products may be substituted for conventional pigments that have been employed for inducing or increasing opacity of substrates. Thus, the present resin particles having an average particle diameter less than one micron, for example, may be used in paints, in inks, in plastics, glass, metal, wood, plaster, in films, on fabrics, paper, and the like. The present polymeric products may also be applied to a substrate such as wood surface, and thereafter fused to a temperature at which the polymeric material is rendered molten in order to produce a uniform polymeric coating.

Although the invention has been described in considerable detail with particular reference to certain preferred embodiments thereof, variations and modifications can be effected within the spirit and scope of the invention as described herein and before and as defined in the appended claims.

What is claimed is:

1. A method for providing a cellulosic substrate with a polymeric coating, which comprises providing said substrate with a coating comprising discrete, substantially spherical microcapsules, said microcapsules having a solid, normally non-tacky organic, polymeric core and a concentric, solid, polymeric shell, said polymeric core being substantially nonadherent to said cellulosic substrate, said polymeric shell being compatible with said cellulosic substrate, said polymeric core being at least partially grafted to said solid polymeric shell which surrounds said polymeric core, and heating said microcapsular coating under conditions which cause said microcapsules to fuse to said cellulosic substrate and thereby provide a polymeric coating on said cellulosic substrate, said grafted polymer being a compatibilizing agent for adhering any ungrafted polymer to said cellulosic substrate.

2. The method of claim 1 wherein between about 20 and about 80 percent of the solid, polymeric core of said microcapsules is grafted to said solid outer shell.

3. The method of claim 1 wherein said solid polymeric shell is a member selected from the group consisting of urea-formaldehyde and methyl cellulose.

4. The method of claim 1 wherein said solid polymeric core is polystyrene.

5. The method of claim 1 wherein said substrate is paper and said microcapsules have an average particle diameter between 1 and 100 microns.

6. The product produced by the method of claim 1.
7. The product produced by the method of claim 2.
8. The product produced by the method of claim 3.
9. The product produced by the method of claim 4.
10. The product produced by the method of claim 5.

11. A method for improving the strength of a cellulosic substrate, which comprises incorporating microcapsules into said substrate, said microcapsules being provided with a solid, polymeric shell and a concentric, solid, normally non-tacky, organic, polymer core, said polymeric core being at least partially grafted to said solid, polymeric shell which surrounds said polymeric core, said polymeric core being normally nonadherent to said cellulosic substrate, said polymeric shell being compatible with said cellulosic substrate, and heating said substrate to cause the fusion of said microcapsules with the cellulosic fibers of said substrate and thereby form a bond between said cellulosic fibers and said microcapsules at points of fiber intersection, said grafted polymer being a compatibilizing agent for adhering any ungrafted polymer to said cellulosic substrate.

12. The method of claim 11 wherein between about 20 and about 80 percent of the solid, polymeric core of said microcapsules is grafted to said solid outer shell.

13. The method of claim 11 wherein said solid polymeric shell is a member selected from the group consisting of urea-formaldehyde and methyl cellulose.

14. The method of claim 11 wherein said solid polymeric core is polystyrene.

15. The method of claim 11 wherein said substrate is paper and said microcapsules have an average particle diameter between 1 and 100 microns.

16. The product produced by the method of claim 11.
17. The product produced by the method of claim 12.
18. The product produced by the method of claim 13.
19. The product produced by the method of claim 14.
20. The product produced by the method of claim 15.

21. The method of claim 11 wherein said polymeric particles comprise between about 1 and about 20 percent by weight of said substrate.

22. The product produced by the method of claim 21.

References Cited

UNITED STATES PATENTS

| | | | |
|---|---|---|---|
| 3,256,138 | 6/1966 | Welch et al. | 117—21 |
| 3,549,403 | 12/1970 | Williams et al. | 117—21 |
| 3,405,071 | 10/1968 | Reyes | 117—100 C |
| 3,516,941 | 6/1970 | Matson | 117—100 C |
| 3,429,827 | 2/1969 | Ruus | 252—316 |
| 3,577,515 | 5/1971 | Vandegaer | 117—100 B |
| 3,386,851 | 6/1968 | Harlan | 117—93.31 |
| 3,281,263 | 10/1966 | Priesing | 117—93.31 |

MURRAY KATZ, Primary Examiner

U.S. Cl. X.R.

117—100 C, 155 UA; 252—316